H. G. VANCE.
SELF OILING BEARING.
APPLICATION FILED SEPT. 6, 1916.

1,237,423.

Patented Aug. 21, 1917.

WITNESSES

INVENTOR
HARVEY G. VANCE,
BY
ATTORNEYS

UNITED STATES PATENT OFFICE.

HARVEY GEORGE VANCE, OF ST. LOUIS, MISSOURI.

SELF-OILING BEARING.

1,237,423.  Specification of Letters Patent.  Patented Aug. 21, 1917.

Application filed September 6, 1916. Serial No. 118,672.

*To all whom it may concern:*

Be it known that I, HARVEY G. VANCE, a citizen of the United States, and a resident of the city of St. Louis, in the State of Missouri, have invented a certain new and useful Improvement in Self-Oiling Bearings, of which the following is a specification.

My invention is an improvement in self-oiling bearings, and has for its object to provide a bearing of the character specified, wherein the movement of the rotating element will maintain a thorough lubrication of both the rotating and fixed elements.

Figure 1:
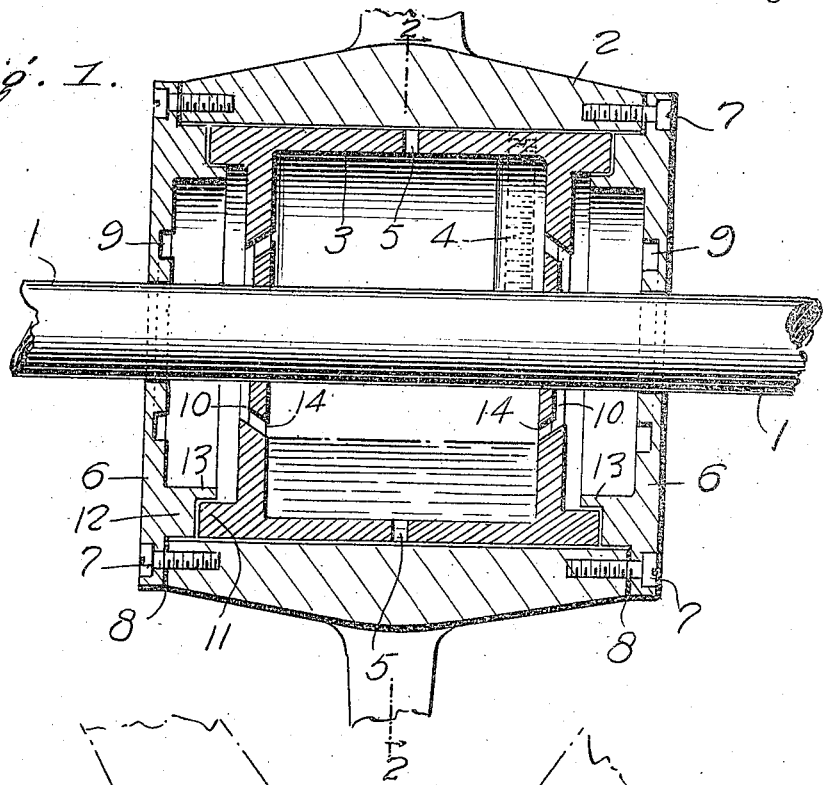
Figure 1 is a horizontal section through the improved bearing.
Figure 2:
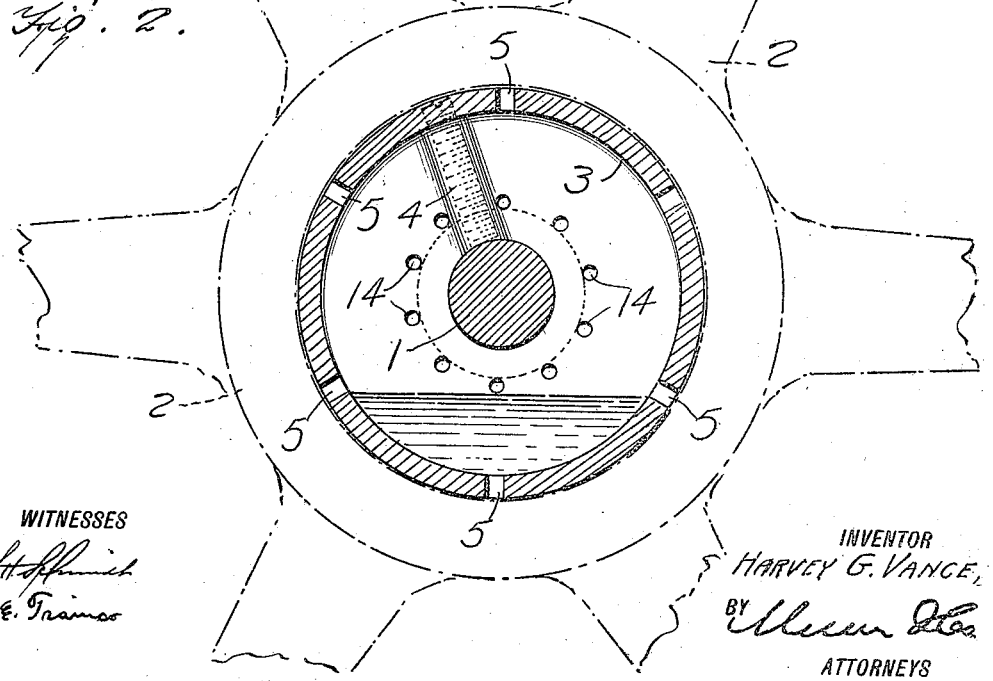
Fig. 2 is a section on the line 2—2 of Fig. 1.

The present embodiment of the invention is shown in connection with a fixed element in the form of a shaft 1 and a rotating element in the form of a hub or bearing 2. The hub or bearing is of much greater diameter than the shaft to receive a substantially cylindrical casing 3, which is secured upon the shaft within the bearing, and the periphery of the casing contacts with the interior of the bearing. This casing 3 has end openings for receiving the shaft, and is adjustably connected therewith by means of a set screw 4 or the like, which is threaded through the casing into engagement with the shaft. This casing is adapted to contain a lubricant which may pass out through radial ports 5 in the casing, into contact with the contacting surfaces of the bearing and the casing. The ends of the hub or bearing are closed by heads 6, the said heads having openings for receiving the shaft 1 and being held to the hub or bearing by means of screws 7. A packing ring or gasket 8 is arranged beneath each head at the adjacent end of the hub or bearing, for closing the ends of the hub or bearing to prevent escape of the lubricant.

The inner face of each head is annularly recessed as indicated at 9, the recess being concentric with the shaft and the outer surface of each head of the casing is recessed as indicated at 10, the recess extending to the opening for the shaft. The recesses 9 are separated from the openings for the shaft, and it will be noticed that each head of the casing is offset inwardly from the end of the casing, so that an annular flange 11 is formed at each end of the casing. Each head 6 has an inwardly extending annular rib or flange 12 which fits within the adjacent end of the hub or bearing 2, and the rib of each head has an extension or annular lip 13 which extends beyond the outer end of the adjacent flange 11, overlapping the inner face of the said flange.

It will be noticed that the inclosing wall of each recess 10 is undercut, as shown, and a series of openings 14 is provided at each recess for permitting the oil collecting in the recess to return to the reservoir, within the casing 3. These openings incline outwardly so that when each opening is on the under side of the shaft, it will incline downwardly toward the oil in the reservoir.

In use, the oil will flow out through the openings 5 flooding the bearing with lubricant, and the oil which passes outwardly and reaches the end of the bearing will flow down between the adjacent faces of the ribs 11 and 12 and between the rib 11 and the lip 13 and along the outer face of the adjacent head of the casing into the recess 10, from whence it will pass into the reservoir. Any oil that may pass down around the lip and flow onto the inner face of the head will eventually reach the recess 9 and will collect therein.

In practice the reservoir within the casing 3 is filled with oil almost to the level of the shaft, and during the movement of the parts the bearing will be flooded with oil, running, in effect, in an oil bath. The improved bearing is especially adapted for loose pulleys, mining car wheels, and wheels of any character running upon a horizontal shaft.

I claim:—

1. A self oiling bearing, comprising in combination with the fixed and the rotating elements, of a casing for lubricant mounted on the fixed element within the rotating element and having radial ports for permitting the lubricant to flow between the contacting surfaces of the casing and the said rotating element, said rotating element having heads closing the ends thereof, and the inner faces of said heads and the outer faces of the ends of the casing being recessed, each head of the casing being offset inwardly from the end of the casing, forming annular flanges at the ends of the casing, the heads of the rotating element having inwardly extending annular ribs coacting with the annular flanges to form oil receiving chambers at the ends of the casing, the ribs of said rotating element heads having extensions overlapping the inner faces of the flanges of the casing, the ends of the casing having ports for placing the said oil receiving chambers in communication with the interior of the casing.

2. A self oiling bearing comprising in combination with the shaft and the wheel having a hub mounted thereon, of a cylindrical casing having an axial opening for receiving the shaft and fitting within the hub and adapted to contain lubricant, said casing having radial ports in its peripheral wall for permitting the lubricant to flow therefrom, each end of the casing having an outwardly extending annular flange, heads closing the ends of the hub and having inwardly extending annular ribs fitting within adjacent ends of the hub and forming with the ends of the casing lubricant receiving chambers, the rib of each head having an annular lip overlapping the inner face of the flange at the end of the casing for deflecting the oil onto the end of the casing, and each end of the casing having means for returning the oil to the interior of the casing.

3. A self oiling bearing comprising in combination with the shaft and the wheel having a hub mounted thereon, of a cylindrical casing between the shaft and the hub and adapted to contain lubricant and having radial ports for permitting lubricant to flow outside the casing, the ends of the casing having marginal flanges and the ends of the hub having inwardly extending ribs abutting the flanges, each rib having an extension extending within the adjacent flange for deflecting the oil inwardly, and each end of the casing having means for receiving the oil and returning it to the interior of the casing.

HARVEY GEORGE VANCE.

Witnesses:
MAYMIE T. VANCE,
H. P. KOENIG.

Copies of this patent may be obtained for five cents each, by addressing the "Commissioner of Patents, Washington, D. C."